US010523508B2

(12) United States Patent
Lu et al.

(10) Patent No.: US 10,523,508 B2
(45) Date of Patent: Dec. 31, 2019

(54) MONITORING MANAGEMENT SYSTEMS AND METHODS

(71) Applicant: Quanta Computer Inc., Taoyuan (TW)

(72) Inventors: Tsai-Hsing Lu, Taoyuan (TW); Wen-Kuang Chen, Taoyuan (TW); Chien-Kuo Hung, Taoyuan (TW); Chun-Hung Chen, Taoyuan (TW); Chen-Chung Lee, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 281 days.

(21) Appl. No.: 15/631,111

(22) Filed: Jun. 23, 2017

(65) Prior Publication Data
US 2018/0302276 A1  Oct. 18, 2018

(30) Foreign Application Priority Data

Apr. 13, 2017  (TW) .............................. 106112343 A (51) Int. Cl.
| G06F 15/173 | (2006.01) |
| H04L 12/24 | (2006.01) |
| H04L 29/08 | (2006.01) |
| H04L 12/26 | (2006.01) |

(52) U.S. Cl.
CPC ............ H04L 41/085 (2013.01); H04L 41/08 (2013.01); H04L 43/04 (2013.01); H04L 67/1002 (2013.01); H04L 43/08 (2013.01); H04L 67/16 (2013.01)

(58) Field of Classification Search
CPC ....... H04L 41/085; H04L 41/08; H04L 43/04; H04L 67/1002; H04L 67/16; H04L 43/08; H04L 41/0893; H04L 41/0803; H04L 43/12; H04L 12/24; H04L 29/08; H04L 12/26
See application file for complete search history.

(56) References Cited

U.S. PATENT DOCUMENTS

| 2007/0168493 | A1* | 7/2007 | Sarwono | G06F 11/006 709/224 |
| 2008/0301081 | A1* | 12/2008 | Karnik | G06F 9/44505 706/48 |
| 2011/0099273 | A1* | 4/2011 | Ide | G06F 11/3006 709/224 |
| 2013/0124713 | A1* | 5/2013 | Feinberg | G06F 11/0769 709/224 |
| 2014/0201356 | A1* | 7/2014 | Hung | H04L 41/046 709/224 |

* cited by examiner

*Primary Examiner* — Cheikh T Ndiaye
(74) *Attorney, Agent, or Firm* — McClure, Qualey & Rodack, LLP (57) ABSTRACT

A monitoring management system is provided to perform a monitoring operation including: detecting a system configuration of an application server; determining whether the system configuration is compliant with a monitoring rule corresponding to the application server; generating a monitoring configuration when the system configuration is compliant with the monitoring rule; and allocating at least one monitoring server to monitor the application server according to the monitoring configuration.

8 Claims, 6 Drawing Sheets

MONITORING MANAGEMENT SYSTEMS AND METHODS

CROSS REFERENCE TO RELATED APPLICATIONS

This Application claims priority of Taiwan Application No. 106112343, filed on Apr. 13, 2017, the entirety of which is incorporated by reference herein.

BACKGROUND OF THE APPLICATION

Field of the Application

The application relates generally to service or equipment monitoring technologies, and more particularly, to monitoring management systems and methods which use multiple processes for managing monitoring operations.

Description of the Related Art

Due to growing demand for ubiquitous computing and networking, various wireless technologies, including Global System for Mobile communications (GSM) technology, General Packet Radio Service (CPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc, have been developed to contribute to ubiquitous network access.

With the convenience of ubiquitous network access, it has become a common choice for service providers to set up their application servers on the Internet to allow users to access the applications or services run on the application servers. In order to maintain stability of the application servers, a common practice is for the network administrator to monitor the system configurations of the application servers so as to handle any developing problems in a timely fashion. However, as the hardware architecture of the application servers becomes complicated or as the number of services provided by the application servers grows rapidly, it may be time consuming and error-prone for the network administrator to manually configure a respective monitoring task for each of the application servers and each of the services provided therein. Therefore, the conventional design is unfavorable regarding efficiency and correctness of the monitoring operations.

BRIEF SUMMARY OF THE APPLICATION

In order to solve the aforementioned problem, the present application proposes to divide management of the monitoring operations into stages and use a respective process for performing each stage, thereby enabling prompt detection and handling of any status change of the application servers, such as installations of new hardware resources or services, or uninstallations of existing hardware resources or services.

In one aspect of the application, a monitoring management system comprising a communication device, a storage device, and a controller is provided. The communication device is configured to provide a network connection to one or more application servers. The storage device is configured to store computer-executable instructions or program code. The controller is configured to load and execute the computer-executable instructions or program code to monitor the application servers, wherein the monitoring of the application servers comprises: detecting a system configuration of the application servers; determining whether the system configuration is compliant with a monitoring rule corresponding to the application servers; generating a monitoring configuration when the system configuration is compliant with the monitoring rule; and allocating at least one monitoring server to monitor the application servers according to the monitoring configuration.

In another aspect of the application, a monitoring management method, executed by a monitoring management system for monitoring one or more application servers, is provided. The monitoring management method comprises: detecting a system configuration of the application servers; determining whether the system configuration is compliant a monitoring rule corresponding to the application servers; generating a monitoring configuration when the system configuration is compliant with the monitoring rule; and allocating at least one monitoring server to monitor the application servers according to the monitoring configuration.

Other aspects and features of the application will become apparent to those with ordinary skill in the art upon review of the following descriptions of specific embodiments of the monitoring management systems and methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
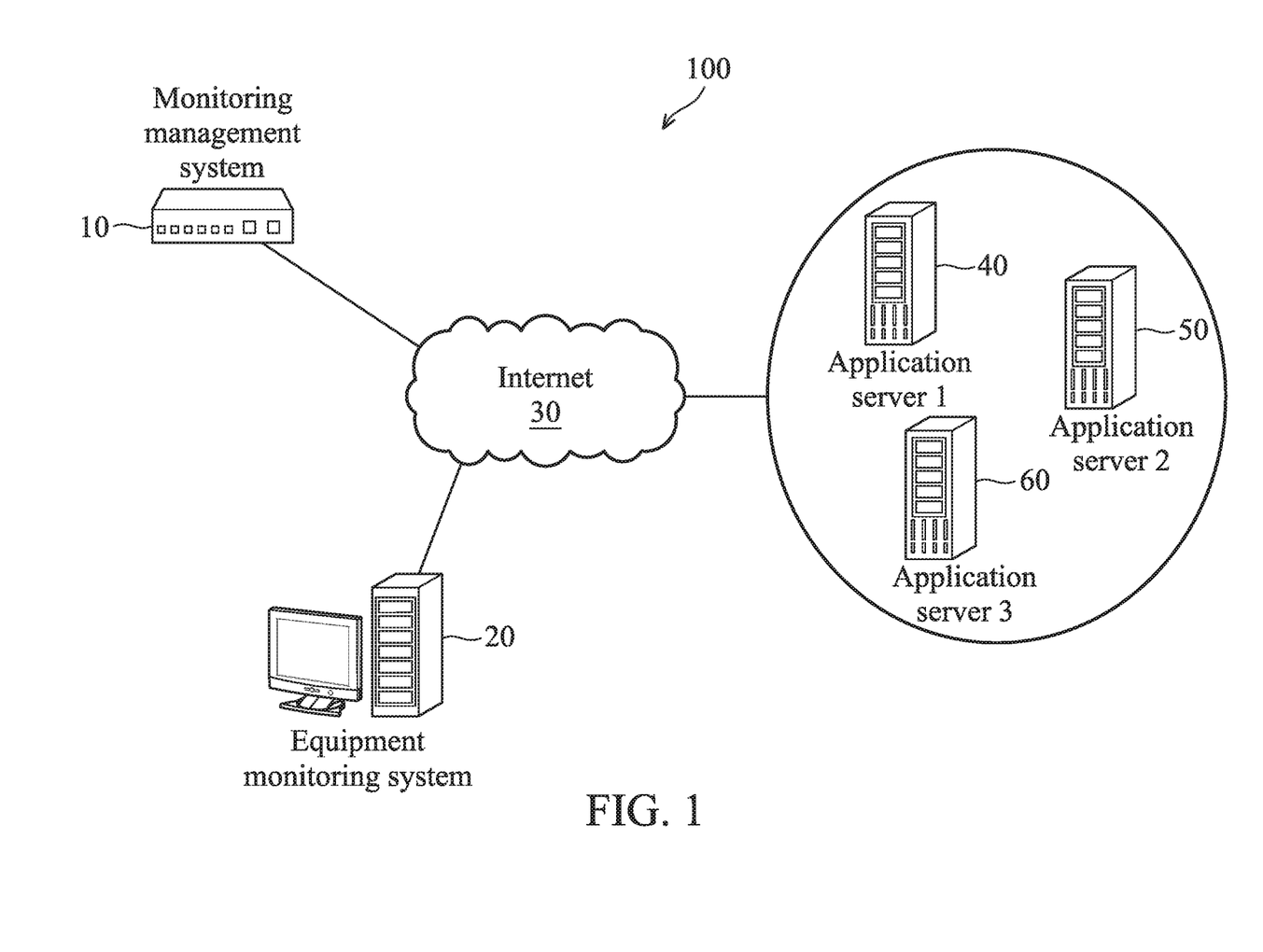
FIG. 1 is a schematic diagram illustrating a monitoring environment according to an embodiment of the application.

FIG. 1 is a schematic diagram illustrating a monitoring environment according to an embodiment of the application. The monitoring environment 100 includes a monitoring management system 10, an equipment monitoring system 20, the Internet 30, and application servers 40~60, wherein the monitoring management system 10 and the equipment monitoring system 20 may connect to the application servers 40~60 through the Internet 30.

The monitoring management system 10 may be a computer host or a computing device, such as a notebook PC, a desktop computer, a workstation, or a server, etc., which is capable of wired/wireless communication and is configured to configure the monitoring tasks which are executed by the equipment monitoring system 20.

The equipment monitoring system 20 may include one or more monitoring hosts, such as notebook PCs, desktop computers, workstations, or servers, etc., wherein each monitoring host is capable of wired/wireless communication and executing monitoring software to monitor the application servers 40~60 according to the monitoring tasks.

In another embodiment, the monitoring management system 10 and the equipment monitoring system 20 may be incorporated into a single system.

Each of the application servers 40~60 may be a computer host which includes a plurality of hardware resources (e.g., a processor, a hard-drive, a memory, and a network card, etc.) for running applications or services, such as an E-mail service, a database service, a web page service, a mobile push service, and/or a File Transfer Protocol (FTP) service.

Figure 2:
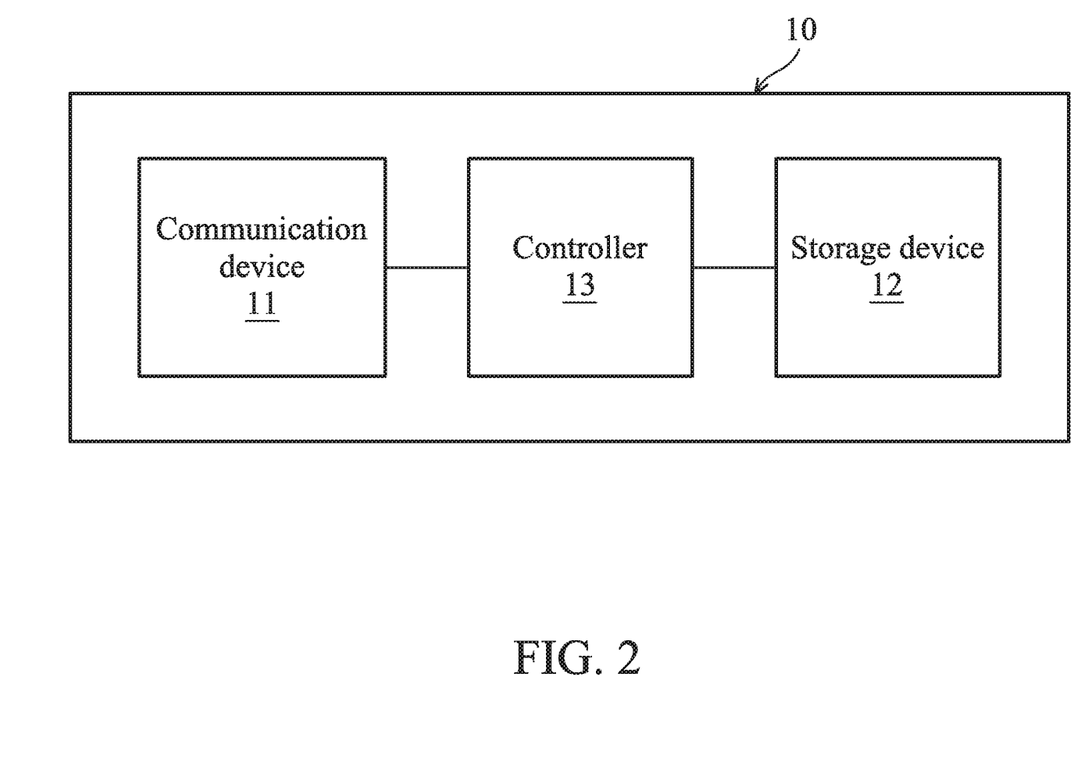
FIG. 2 is a block diagram illustrating the hardware architecture of the monitoring management system 10 according to an embodiment of the application.

FIG. 2 is a block diagram illustrating the hardware architecture of the monitoring management system 10 according to an embodiment of the application. The monitoring management system 10 includes a communication device 11, a storage device 12, and a controller 13.

The communication device 11 is responsible for providing a network connection to the Internet 30, and the equipment monitoring system 20 and the application servers 40~60 on the Internet 30. The communication device 11 may provide the network connection using a wired/wireless communication technology, such as the Ethernet, Wireless Fidelity (Wi-Fi), Worldwide Interoperability for Microwave Access (WiMAX), Global System for Mobile communications (GSM), Wideband Code Division Multiple Access (WCDMA), or Long Term Evolution (LTE) technology.

The storage device 12 is a non-transitory machine-readable storage medium, such as a Random Access Memory (RAM), or a FLASH memory, or a magnetic storage device, such as a hard disk or a magnetic tape, or an optical disc, or any combination thereof for storing computer-executable instructions or program code, including instructions or program code of applications/services and/or communication protocols. In addition, the storage device 12 stores computer-executable instructions or program code of the method of the present application.

In one embodiment, the storage device 12 may also store a database that is used in the method of the present application.

The controller 13 may be a general-purpose processor, a Micro Control Unit (MCU), an Application Processor (AP), or a Digital Signal Processor (DSP), which includes various circuits for performing the functions of data processing and computing, controlling the communication device 11 to provide the network connection, and reading or storing data from or to the storage device 12. In particular, the controller 13 coordinates the operations of the communication device 11 and the storage device 12 to carry out the method of the present application.

As will be appreciated by persons skilled in the art, the circuits in the controller 13 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in design of electronic and digital systems.

It should be understood that the components described in the embodiment of FIG. 2 are for illustrative purposes only and are not intended to limit the scope of the application. For example, the monitoring management system 10 may further include a display device (e.g., a Liquid-Crystal Display (LCD), Light-Emitting Diode (LED) display, or Electronic Paper Display (EPD), etc.), an Input/Output (I/O) device one or more buttons, a keyboard, a mouse, a touch pad, a video camera, or a microphone, etc.), a power supply, and/or a Global Positioning System (GPS) device.

Figure 3:
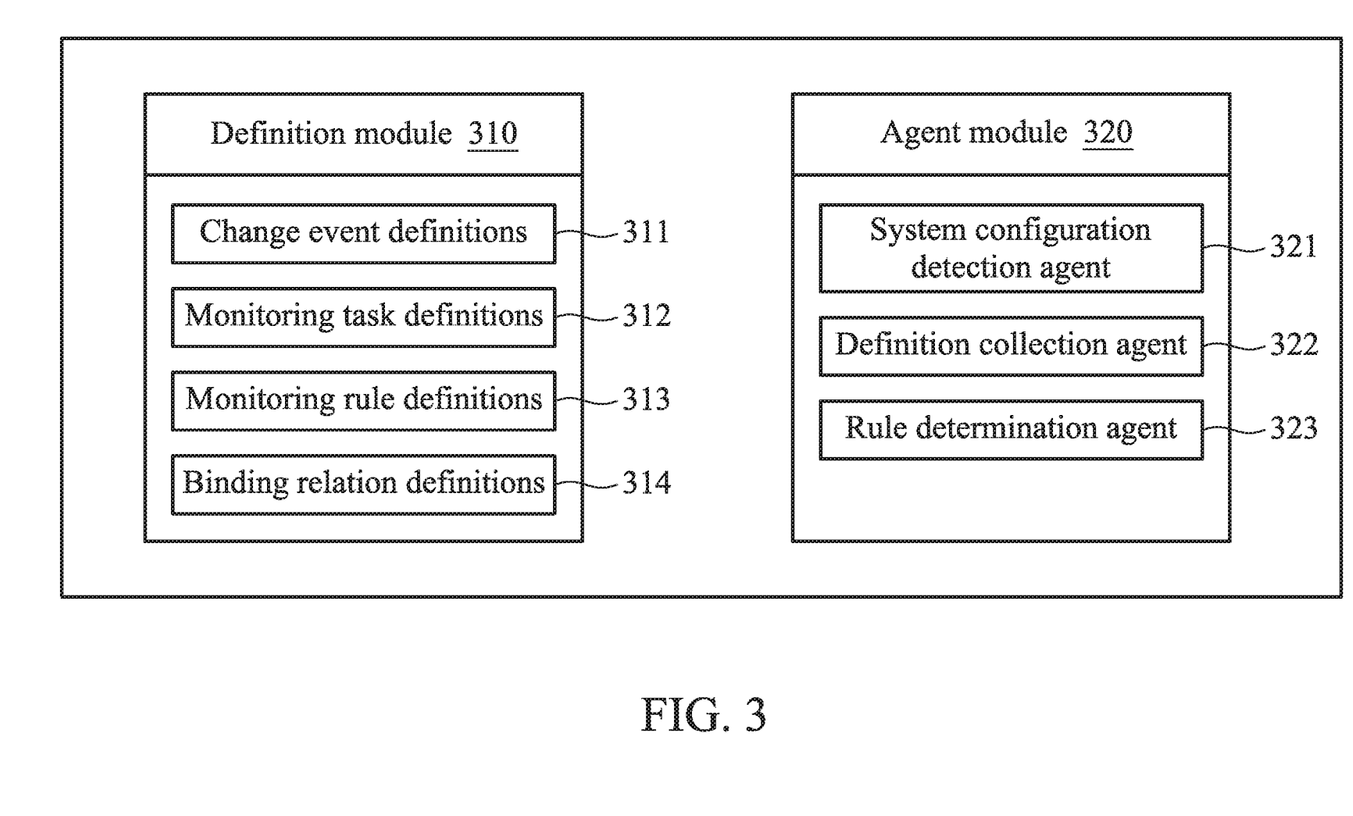
FIG. 3 is a block diagram illustrating the software architecture of the monitoring management method according to an embodiment of the application.

FIG. 3 is a block diagram illustrating the software architecture of the monitoring management method according to an embodiment of the application. In this embodiment, the monitoring management method is applied to the monitoring management system 10. Specifically, the monitoring management method may be implemented with multiple software modules which are further loaded and executed by the controller 13. The software architecture includes a definition module 310 and an agent module 320.

The definition module 310 is responsible for providing definitions and rules which are required for performing the monitoring tasks, wherein the definitions and rules may be updated with the changes in the system configurations of the application servers 40~60 or in the user settings. The definition module 310 includes change event definitions 311, monitoring task definitions 312, monitoring rule definitions 313, and binding relationship definitions 314.

The change event definitions 311 specify the change events to be monitored, wherein the change event may refer to the changes in the system configurations of the application servers 40~60 and may be adjusted according to user preference/experience or history of previous monitoring tasks. In one embodiment, the changes that the equipment monitoring system 20 is capable of monitoring may be provided, and the change event definitions may be determined therefrom.

A change event may be defined by the target of change, the type of change, the operand, and the threshold value. The target of change may be a service or a hardware resource in an application server. The type of change may refer to an installation or uninstallation of a service or hardware resource. The operand may be "greater than", "less than", or "equal to". The threshold value may be any positive integer. In one embodiment, a change event definition may be checked to see if the target of change, the type of change, the operand, and the threshold value are valid, before storing the change event definition into the database.

For example, if a change event refers to the installation of a database service in a specific application server, the target of change is the database service in that application server, the type of change is an installation of a service, the operand may be "equal to", and the threshold value may be 1. Alternatively, if a change event refers to the uninstallation of a web page service in a specific application server, the target of change is the web page service in that application server, the type of change is an uninstallation of a service, the operand may be "equal to", and the threshold value may be 1. Alternatively, if a change event refers to the installation of a plurality of hard-drives in a specific application server, the target of change is the hard-drives in that application server, the type of change is an installation of a hardware resource, the operand may be "greater than", and the threshold value may be 1.

The monitoring task definitions 312 specify the monitoring tasks that should be performed when change events occur. For example, when a database service is newly installed in an application server (i.e., a change event occurs), the monitoring tasks corresponding to the change event may include monitoring the database service in the day time by monitoring software A, and monitoring the database service in the night time by monitoring software B.

In one embodiment, the monitoring tasks supported by the equipment monitoring system 20 may be provided first, and the monitoring task definitions may be determined based on the supported monitoring tasks. A monitoring task definition may be checked to see if it is valid, before storing the monitoring task definition into the database. For example, if a monitoring task definition specifies a first monitoring task for monitoring a target of change in the day time by monitoring software A, and a second monitoring task for monitoring the same target of change 24-7 by monitoring software B, then the first monitoring task overlaps with the second monitoring task in the day time, and the monitoring task definition may be adjusted to avoid any waste of system resources due to overlapping monitoring tasks.

The monitoring rule definitions 313 specify the monitoring rules which are defined by the associations between the change events and the monitoring tasks. For example, change event 1 refers to the installation of a web server software in a specific application server, and change event 2 refers to the installation of one or more web page services on the web server software. When one or both of the change events occur, the monitoring task associated with one or both of the change events may include monitoring the traffic and the number of online users for each web page of the web page services by monitoring software B.

In one embodiment, the associated change events and monitoring tasks may be cross checked to see if there's any contradiction therebetween, and if not, the monitoring rule definitions 313 may be stored into the database. For example, change event 1 may refer to the installation of one or more web page services on a web server software, while change event 2 may refer to the uninstallation of one or more web page services on the web server software. If there's a monitoring rule indicating that a monitoring task should be performed when both the change events 1 and 2 occur, this monitoring rule should be adjusted since change events 1 and 2 will not occur at the same time.

The binding relationship definitions 314 specify the binding relationships between the monitoring rules and the monitoring targets. In other words, the binding relationships indicate which of the monitoring rules to apply to which of the monitoring targets. The monitoring targets may refer to one specific application server, or a plurality of application servers within a specific range of Internet Protocol (IP) addresses, or a plurality of application servers in a specific group. For example, if the application servers in the IP range [192.168.0.1~192.168.0.255] are defined to be the monitoring targets, each new application server added into this IP range will be automatically monitored.

To further clarify the definitions and rules provided by the definition module 310, an example is given as follows. The change event definitions 311 may specify change events a1~a4, wherein the change event a1 refers to the installation of a web page service, the change event a2 refers to the installation of a database service, the change event a3 refers to the uninstallation of a web page service, and the change event a4 refers to the uninstallation of a database service. The monitoring task definitions 312 may specify monitoring tasks b1~b4, wherein the monitoring task b1 indicates monitoring web page services, the monitoring task b2 indicates not monitoring web page services, the monitoring task b3 indicates monitoring database services, and the monitoring task b4 indicates not monitoring database services. The monitoring rule definitions 313 may specify monitoring rules, including the monitoring rule [a1, b1] which indicates that the change event a1 is associated with the monitoring task b1, the monitoring rule [a2, b3] which indicates that the change event a2 is associated with the monitoring task b3, the monitoring rule [a3, b2] which indicates that the change event a3 is associated with the monitoring task b2, and the monitoring rule [a4, b4] which indicates that the change event a4 is associated with the monitoring task b4. The binding relationship definitions 314 may specify binding relationships indicating to: apply the monitoring rule [a1, b1] on the application server 40, apply the monitoring rule [a2, b3] on the application server 40, apply the monitoring rule [a3, b2] on the application server 40, and apply the monitoring rule [a1, b1] on the application server 50.

The agent module 320 includes a system configuration detection agent 321 (also called a first task agent), a definition collection agent 322 (or called a second task agent), and a rule determination agent 323 (also called a third task agent), wherein each agent is instantiated by one or more processes and is responsible for handling a different part of the monitoring operations according to the definitions and rules provided by the definition module 310, so that the monitoring operations may be completed with the collective work of the agents.

The system configuration detection agent 321 is responsible for initiating one or more processes to serve as one or more task agents for detecting system configurations of the application servers, and storing the system configurations into the system configuration message queue to wait to be saved to the database. Specifically, a system configuration may include information concerning services running on an application server, and/or hardware resources installed on the application server. The system configuration detection agent 321 selects one or more application servers to detect the system configurations thereof, according to the binding relationship definitions stored in the database.

In one embodiment, assuming that the system configuration detection agent 321 is capable of detecting the system configurations of a predetermined number of application servers (i.e., the capability threshold of the system configuration detection agent 321), the system configuration detection agent 321 may initiate a new process to add one more task agent (i.e., a duplicate of the task agent) when the number of application servers in the monitoring environment exceeds the predetermined number. Likewise, the system configuration detection agent 321 may remove the duplicate of the task agent when the number of application servers in the monitoring environment is less than a predetermined number.

Figure 4:
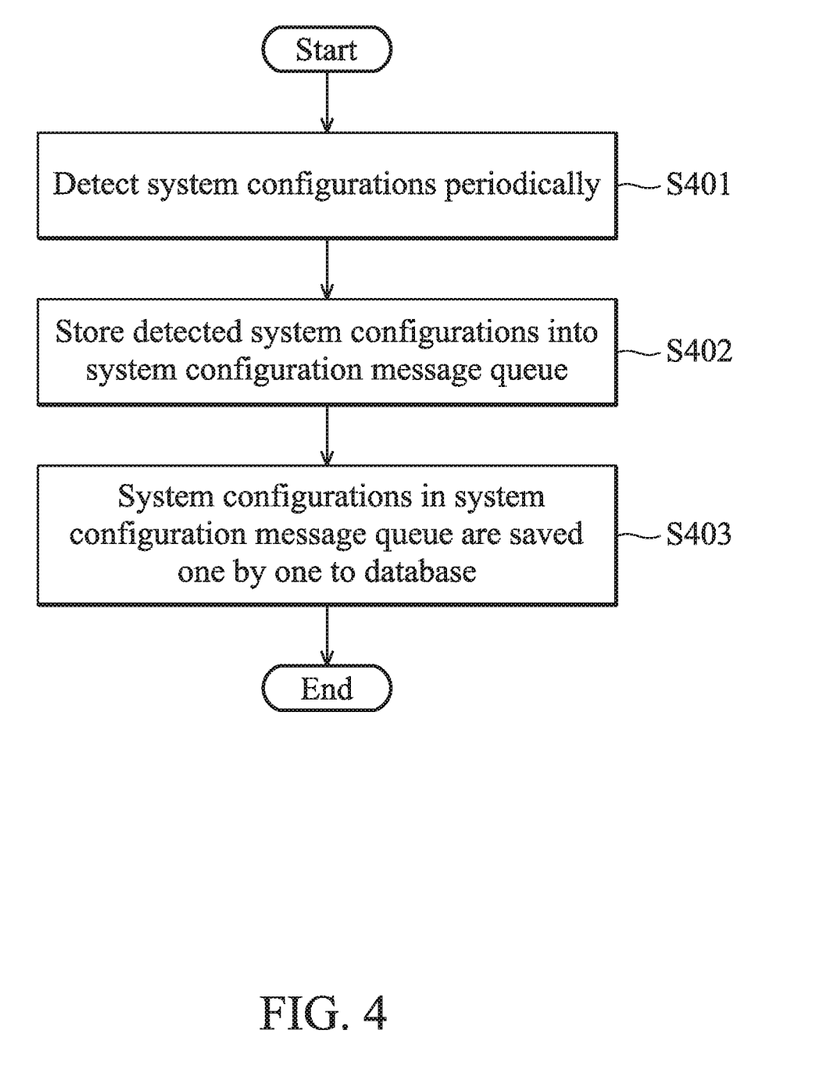
FIG. 4 is a flow chart illustrating the operation of the system configuration detection agent 321 according to an embodiment of the application.

FIG. 4 is a flow chart illustrating the operation of the system configuration detection agent 321 according to an embodiment of the application. Please note that reference to FIG. 6 may provide a better understanding the operation of the system configuration detection agent 321 in FIG. 4. To begin, the system configuration detection agent 321 retrieves from the database the binding relationship definitions to determine the target application servers to periodically detect the system configurations thereof (step S401). Next, the system configuration detection agent 321 stores the detected system configurations into the system configuration message queue (step S402), and then the system configurations in the system configuration message queue are saved one by one to the database (step S403), and the flow chart ends.

The system configuration message queue is a First-In-First-Out (FIFO) queue. That is, the system configuration that is stored earlier into the system configuration message queue will be retrieved earlier by the definition collection agent 322.

The definition collection agent 322 is responsible for initiating one or more processes to serve as one or more task agents for retrieving from the database the binding relationship definitions, and storing them into the definition message queue to wait to be retrieved by the rule determination agent 323.

In one embodiment, the definition collection agent 322 may initiate a new process to add one more task agent (i.e., a duplicate of the task agent) when the amount of the binding relationship definitions in the database exceeds a threshold that the definition collection agent 322 is capable of handling (i.e., the capability threshold of the definition collection agent 322). Likewise, the definition collection agent 322 may remove the duplicate of the task agent when the amount of the binding relationship definitions is less than a threshold.

The definition message queue is a FIFO queue. That is, the binding relationship definition that is stored earlier into the definition message queue will be retrieved earlier by the rule determination agent 323.

The rule determination agent 323 is responsible for initiating one or more processes to serve as one or more task agents for determining whether any of the system configurations is compliant with any binding relationship definitions (i.e., whether the system configuration of an application server is compliant with the monitoring rule corresponding to the application server).

In one embodiment, the rule determination agent 323 may initiate a new process to add one more task agent (i.e., a duplicate of the task agent) when the amount of the binding relationship definitions in the definition message queue exceeds a threshold that the rule determination agent 323 is capable of handling (i.e., the capability threshold of the rule determination agent 323). Likewise, the rule determination agent 323 may remove the duplicate of the task agent when the amount of the binding relationship definitions is less than a threshold.

Figure 5:
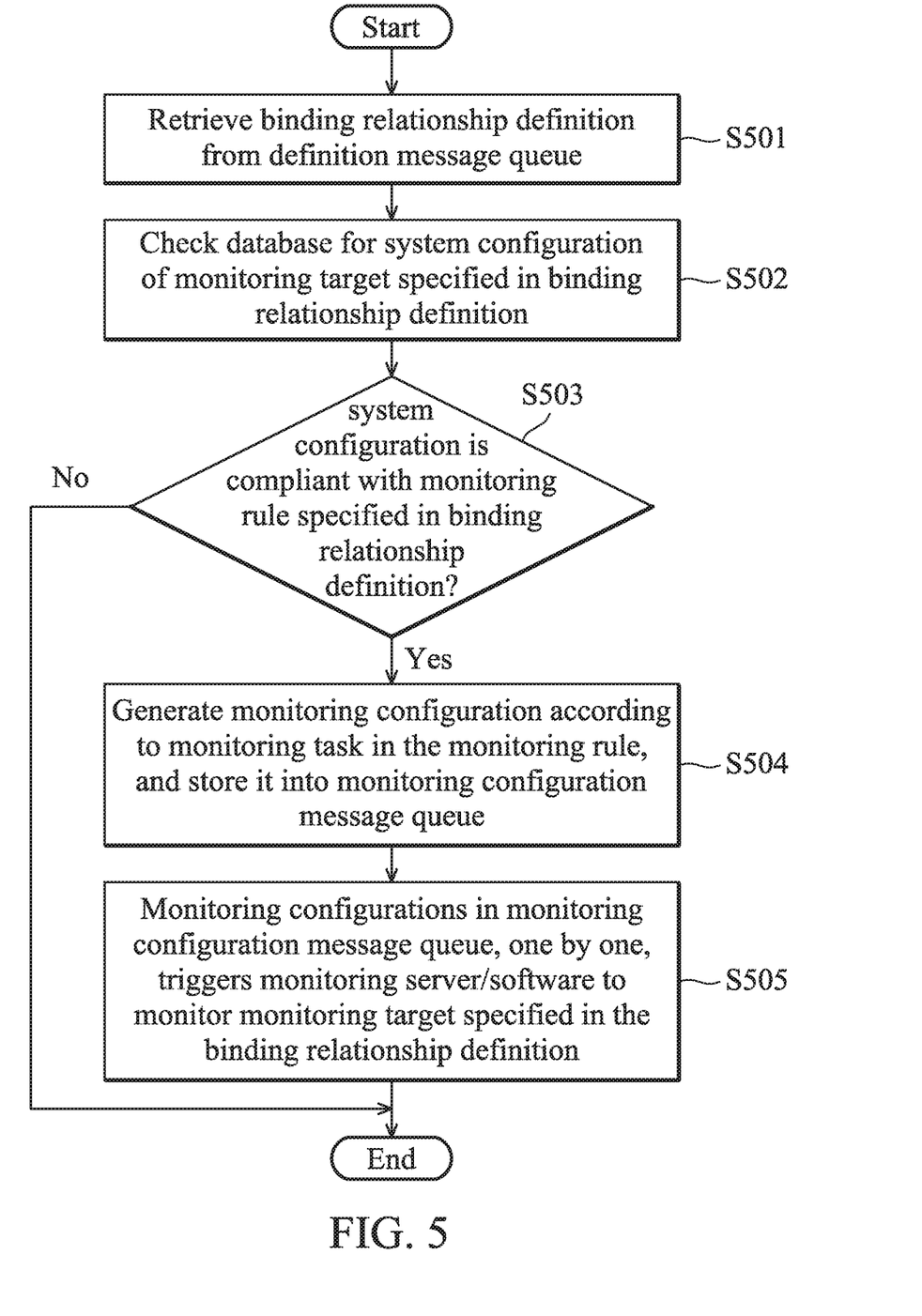
FIG. 5 is a flow chart illustrating the operation of the rule determination agent 323 according to an embodiment of the application.

FIG. 5 is a flow chart illustrating the operation of the rule determination agent 323 according to an embodiment of the application. Please note that reference to FIG. 6 may provide a better understanding the operation of the rule determination agent 323 in FIG. 5. To begin, the rule determination agent 323 retrieves a binding relationship definition from the definition message queue (step S501), and checks the database for the system configuration of the monitoring target specified in the binding relationship definition (step S502). Next, the rule determination agent 323 determines whether the system configuration is compliant with the monitoring rule specified in the binding relationship definition (step S503), and if not, the flow chart ends.

Otherwise, if the system configuration is compliant with the monitoring rule specified in the binding relationship definition, the rule determination agent 323 generates a monitoring configuration according to the monitoring task in the monitoring rule, and stores the monitoring configuration into the monitoring configuration message queue (step S504). Specifically, a monitoring configuration may include a first indicator for indicating a monitoring server or monitoring software to perform the monitoring task, a second indicator for indicating the time to perform the monitoring task, and a monitoring item for indicating a service provided by which application server, or a hardware resource of which application server.

Subsequently, the monitoring configurations in the monitoring configuration message queue, one by one, trigger a monitoring server or monitoring software to monitor the monitoring target specified in the binding relationship definition (step S505) and the flow chart ends.

The monitoring configuration message queue is a FIFO queue. That is, the monitoring configuration that was stored earlier into the monitoring configuration message queue will be retrieved earlier by the monitoring server or monitoring software.

Figure 6:
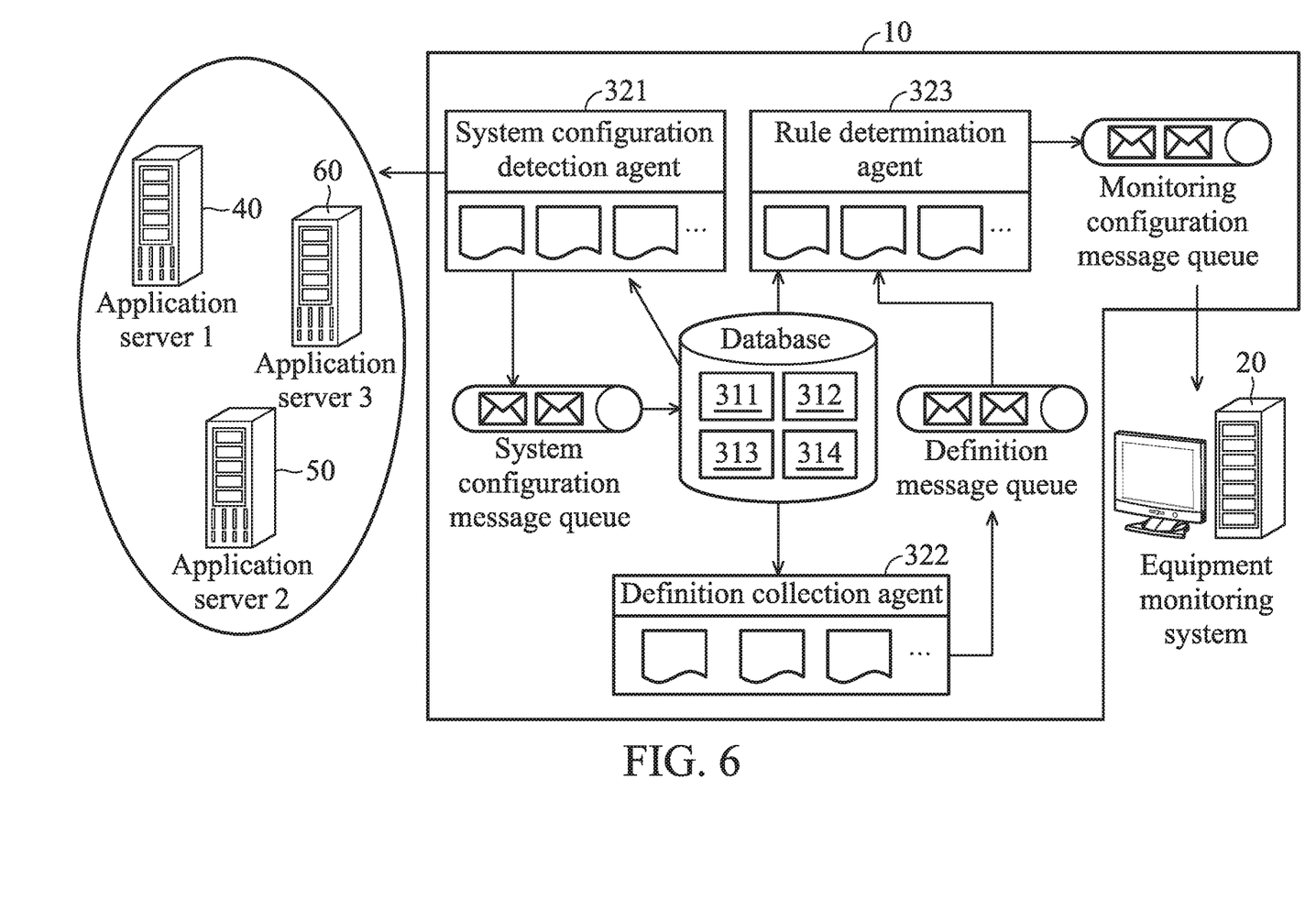
FIG. 6 is a block diagram illustrating the monitoring management according to the embodiment of FIG. 3.

FIG. 6 is a block diagram illustrating the monitoring management according to the embodiment of FIG. 3. As shown in FIG. 6, the system configuration detection agent 321 periodically detects the system configurations of the application servers according to the binding relationship definitions in the database, and stores the system configurations into the system configuration message queue which triggers the system configurations to be saved to the database.

For example, if a binding relationship indicates that the monitoring target is the application server 40 and the change event in the monitoring rule refers to the installation or uninstallation of a web page service and a database service, then the system configuration detection agent 321 will periodically detect the system configuration of the application server 40, particularly regarding the web page service and the database service. Alternatively, if a binding relationship indicates that the monitoring target is the application server 50 and the change event in the monitoring rule refers to the installation or uninstallation of a web page service, then the system configuration detection agent 321 will periodically detect the system configuration of the application seater 50, particularly regarding the web page service.

Subsequently, the definition collection agent 322 retrieves the binding relationship definitions from the database, and stores them into the definition message queue.

Next, the definition collection agent 322 retrieves a binding relationship definition from the definition message queue, and checks the database for the system configuration of the monitoring target in the binding relationship definition. Then, the definition collection agent 322 determines whether the system configuration of the monitoring target is compliant with the monitoring rule in the binding relationship definition, and if so, it generates a monitoring configuration according to the monitoring task in the monitoring rule and stores the monitoring configuration into the monitoring configuration message queue.

After that, monitoring software on a monitoring server in the equipment monitoring system 20 will be allocated to monitor the monitoring target according to each of the monitoring configurations in the monitoring configuration message queue.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", "third", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A monitoring management system, comprising:
   a communication device, configured to provide a network connection to one or more application servers;
   a storage device, configured to store computer-executable instructions or program code and store a database for maintaining a system configuration of the application servers and information of a binding relationship between the application servers and a monitoring rule corresponding to the application servers; and
   a controller, configured to load and execute the computer-executable instructions or program code to monitor the application servers, wherein the monitoring of the application servers comprises:
   detecting the system configuration of the application servers according to the binding relationship;
   initiating a first process to serve as a first task agent for storing the system configuration into a first queue to wait to be saved to the database;
   initiating a second process to serve as a second task agent for retrieving the information of the binding relationship from the database and storing the information of the binding relationship into a second queue;
   initiating a third process to serve as a third task agent for retrieving the information of the binding relationship from the second queue to determine whether the system configuration is compliant with the monitoring rule corresponding to the application servers;
   generating a monitoring configuration when the system configuration is compliant with the monitoring rule; and
   allocating at least one monitoring server to monitor the application servers according to the monitoring configuration.

2. The monitoring management system as claimed in claim 1, wherein the controller is further configured to initiate another process to duplicate the first task agent when a number of the application servers exceeds a first capability threshold of the first task agent, and initiate another process to duplicate the second task agent or the third task agent when an amount of the information of the binding relationship exceeds a second capability threshold of the second task agent or a third capability threshold of the third task agent.

3. The monitoring management system as claimed in claim 1, wherein the monitoring rule indicates a type of a change in the system configuration, and a monitoring task corresponding to the type of the change.

4. The monitoring management system as claimed in claim 1, wherein the monitoring configuration comprises at least one of the following:
   a first indicator for indicating the monitoring server;
   a second indicator for indicating a time to monitor the application servers; and
   a monitoring item for indicating a service provided by the application servers or a hardware resource of the application servers.

5. A monitoring management method, executed by a monitoring management system for monitoring one or more application servers, the monitoring management method comprising:
   detecting a system configuration of the application servers according to a binding relationship between the application servers and a monitoring rule corresponding to the application servers;
   storing a database for maintaining the system configuration and information of the binding relationship;
   initiating a first process to serve as a first task agent for storing the system configuration into a first queue to wait to be saved to the database;
   initiating a second process to serve as a second task agent for retrieving the information of the binding relationship from the database and storing the information of the binding relationship into a second queue;
   initiating a third process to serve as a third task agent for retrieving the information of the binding relationship from the second queue to determine whether the system configuration is compliant with the monitoring rule corresponding to the application servers;
   generating a monitoring configuration when the system configuration is compliant with the monitoring rule; and
   allocating at least one monitoring server to monitor the application servers according to the monitoring configuration.

6. The monitoring management method as claimed in claim 5, further comprising:
   initiating another process to duplicate the first task agent when a number of application servers exceeds a first capability threshold of the first task agent; and
   initiating another process to duplicate the second task agent or the third task agent when an amount of the information of the binding relationship exceeds a second capability threshold of the second task agent or a third capability threshold of the third task agent.

7. The monitoring management method as claimed in claim 5, wherein the monitoring rule indicates a type of a change in the system configuration, and a monitoring task corresponding to the type of the change.

8. The monitoring management method as claimed in claim 5, wherein the monitoring configuration comprises at least one of the following:
   a first indicator for indicating the monitoring server;
   a second indicator for indicating a time to monitor the application servers; and
   a monitoring item for indicating a service provided by the application servers or a hardware resource of the application servers.

* * * * *